Patented Oct. 3, 1950

2,524,738

UNITED STATES PATENT OFFICE 2,524,738

HYDROXYQUINOLINE AND BORIC ACID FUNGISTATIC COMPOSITION

Foster Dee Snell, New York, and Samuel S. Epstein, Brooklyn, N. Y.

No Drawing. Application February 7, 1945, Serial No. 576,710

2 Claims. (Cl. 167—58)

This invention relates to a composition and method for fungistatic control.

The application is a continuation in part of copending application Serial No. 355,608, filed by us on September 6, 1940 now abandoned.

Fungi are plants devoid of chlorophyll and that reproduce by means of spores. The cell walls of certain groups of fungi are considered to consist of cellulose or of chitin. Fungi appear in many forms, one example of which is the mushroom. Fungi which are known to produce skin infections of the nature of ringworm, athlete's foot, etc. are the following: *Trichophyton violaceum, Trichophyton gypssum, Trichophyton purpureum, Trichophyton interdigitale, Trichophyton sulfureum, Epidermophyton inguinale, Epidermophyton floccosum, Monilia albicans. Trichophyton rosaceum* has been suspected of being a competent producing cause but the weight of evidence is otherwise, in fact it may not even be a true trichophyton.

Many factors are involved in fungicidal or fungistatic properties. Bacteristats or bactericides are generally ineffective against fungi, especially against the Epidermophytons.

The fungistatic composition of the present invention is particularly adapted for use in preventing Epidermophyton infection, such as popularly designated by the term athlete's foot. The invention will be illustrated, therefore, by description in detail in connection with the prevention of such infection.

The invention provides a composition in which the fungistatic agent is bonded by chemical reaction with a protein, as on the skin to which the composition may be applied, a composition that is soothing, non-toxic, easy to apply, without staining or deteriorating effect upon fabrics with which it may come into contact, highly effective, and soluble in perspiration to such an extent as to give an effective concentration but not soluble to such an extent as to cause local overconcentration or irritation under conditions of use. In a preferred embodiment, the invention provides a composition including also an agent adapted to neutralize alkalinity of stale perspiration and increase the effectiveness of the active agent, and an absorbent powder adapted to absorb the solution of the fungistatic agent that develops on contact with perspiration.

The agent whose fungistatic effect we have discovered and that makes possible compositions of the desirable properties stated in 8-hydroxyquinoline. The compound quinoline has the structure

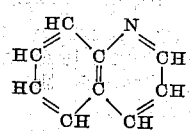

and from it could theoretically be derived seven monohydroxy compounds. Of these six are known and have been a subject of investigation. The present application is concerned solely with that known as 8-hydroxyquinoline, of formula

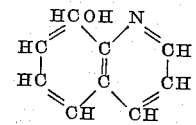

Many derivatives of 8-hydroxyquinoline have had a limited and not too successful use. These derivations are the following:

Chinosol or 8-hydroxyquinoline sulfate $(HOC_9H_6N)_2.H_2SO_4$ which is very soluble in water, markedly acid in solution and corrosive. It is bacteristatic.

Hydroxyquinoline benzoate, $HOC_9H_6N.C_6H_5COOH$ is oil soluble.

8-hydroxyquinoline-5-sulfonic acid and its salts, $HOC_9H_6N.SO_3H$ which is freely soluble in water.

The sulfate and sulfonate are prepared to obtain water solubility to a degree such that they are not suitable for the purpose of this application.

The benzoate is a desirable compound for use in organic solvents but it does not appear to be the product which results if 8-hydroxyquinoline is dissolved in water containing benzoic acid and in any event the concentration present could not be controlled simply by solution of the commercial oxyquinoline benzoate in the way it is controlled here.

Attempts have been made to apply 8-hydroxyquinoline in a bandage out of contact with the skin from which it would be diffused or volatilized to contact as a gas the surface to be treated. In contrast with that by exercise of suitable control we find that it can be properly applied directly on the skin.

The compound 8-hydroxyquinoline is soluble in water to the extent of a few hundredths part or so for 100 parts of water at ordinary temperatures. Even in such dilute solution, the compound is effective in fungistatic control in that it prevents substantially completely the growth and development of fungi. Being so little soluble, on the other hand, the composition can never be dissolved in perspiration or in water to such an extent as to introduce objectionable effects upon fabrics or to irritate the skin and in practical experience is not satisfactory alone. We find, however, that we can increase the concentration which is present to such a degree as to be highly effective, yet not be undesirably concentrated, by the use of a mild acid in conjunction therewith. Our invention is therefore limited to the use of 8-hydroxyquinoline with such an acid. Such acid also exercises other functions as will be more fully set forth.

Because of the effectiveness of 8-hydroxyquinoline, it is used in a composition containing a minor proportion only of it. Thus, there has been used to advantage 8-hydroxyquinoline in proportion of the order of ⅛ to 2 parts for 100 parts of the total composition. Particularly good results have been obtained at low cost when the 8-hydroxyquinoline constitutes about ¼ per cent of the composition, proportions here and elsewhere herein being expressed as parts by weight.

When an acid is used to neutralize alkalinity that may be present on the skin at the time of use of the 8-hydroxyquinoline and thus prevent forming of a soluble alkali salt of the 8-hydroxyquinoline, the acid used is weak and is preferably one that in solid form is non-irritating and is soothing and that dissolves in water to a limited extent, to give a solution of low concentration of hydrogen ions. A suitable acid is boric acid, suitably in the form of fine powder. When boric acid is used, its proportion advantageously is about 15 to 30 parts for 100 parts of the whole composition. A proportion that has been used very successfully is 25 parts of boric acid. This amount of boric acid is in excess of the stoichiometric proportion for reaction with the 8-hydroxyquinoline. Salicylic acid may be used with the introduction of somewhat greater irritant properties. In general, the acid may be inorganic or organic in nature, provided it has a solubility under 5 parts in 100 parts of water at body temperature and is non-irritating or not seriously irritating at that concentration and temperature. Other suitable acids which will produce greater or lesser solubility according to their strengths are succinic, malonic, malic, maleic, fumaric, etc.

As the absorbent powder adapted to absorb the solution of 8-hydroxyquinoline that is formed in the presence of perspiration, there is used material such as powdered talc or talcum, pyrophyllite, diatomite, starch, or other like non-irritating absorptive material that is chemically inert towards the other ingredients present. The proportion of the absorbent powder is ordinarily more than half of the total composition, and preferably sufficient to make 100 parts when the 8-hydroxyquinoline and boric acid or like weak acid are used in the proportions stated.

The absorbent powder serves as a suitable reservoir of the solution of the 8-hydroxyquinoline and boric acid in perspiration. This differentiates it from the unsuccessful attempts to apply the sulfate or the benzoate in limited concentration in an oily medium. There only the limited amount of relatively stable compound is present whereas here a transitory compound with a mild acid is used in direct contact with the skin with the absorbent powder serving as a reservoir.

The possible use of 8-hydroxyquinoline for treatment of athlete's foot has been mentioned by Greenbaum and Harrisson (Pennsylvania Medical Journal, June 1940, pp. 1289–95). It was applied on socks of unspecified composition, as an alternative chemical in a process requiring a locking agent to hold the chemical in position by precipitation.

It is also recognized that the problem in production of prophylaxis against athlete's foot is a dual one. The spores exist and are extremely resistant against most agents. When they develop they form the less resistant vegetative form which will in turn produce spores. Many agents will kill the vegetative form which are not of sufficient strength to kill the spores. While the evidence is not sufficient to give absolute proof, the prepoderance of evidence indicates that 8-hydroxyquinoline in sufficient concentration kills the vegetative form, thus preventing the formation of more spores. Furthermore during protracted treatment the spores develop to the vegetative form and are thus killed in that form, thereby ultimately ridding the patient of infestation. If such is the case it is not within the scope of this application unless fortified by the increased effectiveness of boric and other mild acids.

Boric acid serves a dual purpose in the product. The pH of the perspiration is known to vary with health of the person and time since the feet were last bathed. This would necessarily affect the solubility of 8-hydroxyquinoline in the perspiration. In the product of this patent the 8-hydroxyquinoline is dissolved in a solution of boric acid in perspiration by the reaction to form an unstable compound

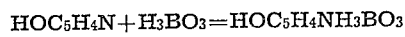

$$HOC_5H_4N + H_3BO_3 = HOC_5H_4NH_3BO_3$$

more soluble than 8-hydroxyquinoline alone but not sufficiently soluble to be deleterious to the skin. As will be shown elsewhere in this application the compound so formed or the 8-hydroxyquinoline itself reacts with the skin, also to form a compound of limited stability.

In making the composition of the kind described the several ingredients in selected proportion are intimately mixed. The materials may be separately ground and then mixed, or they may be interground. In any case, the resulting material contains absorbent powder extending between the spaced particles of active fungistatic agent. In such a composition, contact of the minute spaced particles of the said agent with the fungi is assured while, at the same time, local overconcentration is avoided. Such contact may be of the solid particles of the fungistatic agent or by solution of such agent in the moisture normally present on either healthy or pathogenic skin. In the latter case, the weak acid provided will also dissolve and exert its effect in increasing or accelerating the effectiveness of the fungistatic agent.

Of the various mycological tests carried out, one will be cited in considerable detail for illustration of the effectiveness of the invention. The standard procedure of the Food and Drug Administration was used so far as applicable. The test culture was *Trichophyton interdigitale,* the medium Sabouraud's dextrose peptone agar at pH 5.8. The powder used consisted of 0.25 per cent 8-hydroxyquinoline, 24.75% boric acid and 75% talc. In preparation of samples No. 3 Whatman paper was cut into 1 cm. squares and the squares wet in distilled water. The wet squares were blotted on filter paper, to remove excess liquid, and then placed in the various powders contained in screw capped glass containers. The containers were shaken vigorously and the paper squares with adhering powder then placed on filter paper. By means of forceps, each square was rubbed against a clean surface of filter paper, to remove loosely adhering particles of powder.

The powdered paper squares were placed directly in contact with inoculated agar.

Incubation was at room temperature for 13 days. Under these conditions the zone of inhibition extending beyond the paper squares amounted to 16–18 mm.

Corresponding use of a solution of 8-hydroxyquinoline in water-solvent solution gave a zone of inhibition of only about 1 mm.

The dry composition of the present invention is particularly useful in avoiding initial infection by the fungi of athlete's foot. Dusting into shoes or into socks to be worn by the exposed person is sufficient. At the same time, the composition is soothing to the feet, rather than objectionable. When boric acid or other weak acid is used, the neutralization of alkalinity of stale putrefied perspiration reduces odor.

It was further observed that the effectiveness of the product appeared to persist for some time after treatments ceased, that it was not necessary to make daily applications to obtain the desired results. As there appeared to be no recognized and well known reason for this, it was investigated. It appeared that some type of unknown compound might be found between the product and the skin. Since this could not be readily determined with the actual skin, protein-type fabric was substituted. For this wool and silk were used. To establish the validity of such a treatment blanks with cotton and rayon were included. The fabric was dipped in a solution containing 4 per cent of boric acid, 0.3 per cent of 8-hydroxyquinoline and 95.7 per cent of water. The fabrics after soaking up this solution were air-dried and later washed. Samples were retained before washing. The results of such a test are as follows, the numerical values being the width of the zone of inhibition, in mm.

| Fabric | Number of washings | | |
|---|---|---|---|
| | 0 | 1 | 5 |
| Wool | 15 | 14 | 5 |
| Silk | 10 | 8 | -- |
| Cotton | 10 | 0 | -- |
| Rayon | 9 | 0 | -- |

To make sure that this was not in error due to failure to wash the fabric drastically, since obviously one washing could be as drastic as 5 lesser ones, the following results were obtained.

| Fabric | Number and kind of washings | | | |
|---|---|---|---|---|
| | 0 | 1 | 5 mild | 5 harsh |
| Wool | 15 | 5 | 5 | 2 |
| Wool, rayon, cotton mix | 10 | 2 | 2 | 1 |

Thus this further experiment appears to clarify the phenomenon discovered. It appears that as soaked the active agent is in part chemically combined with the fabric, in part present there as the free material. The width of zone so given is about 15 mm. on wool, about 10 on cotton or mixed goods which are less absorbent, a little less on rayon which is even less absorbent. When given a single washing this readily washes out of the non-proteinaceous fabrics to give a material which is ineffective. With the wool this washing out is more difficult so that it is with some difficulty that the free agent is removed. When so removed a zone of 5 mm. is obtained with wool which is not further removed in even 5 mild and careful washings. If a mixed goods containing wool is used the zone is proportionately less, 2 mm. for example. If however drastic washing is practiced then, since the material is all or nearly all on the surface sufficient of it is removed mechanically so that the width of the zone can be reduced. This all indicates that a true combination of the 8-hydroxyquinoline and boric acid compound with the protein-containing material is obtained, that the effect is not merely one of the agent drying on the fabric, to be dissolved away in any reasonable subsequent application of water.

The extent of application can be varied to give lesser or greater zones of inhibition but the above data are specific as to the amount of agent applied, method of application, etc.

The details given are for the purpose of illustration. It is to be understood that variations within the spirit of the invention are intended to be included within the scope of the appended claims.

What we claim is:

1. A fungistatic composition for preventing growth of the fungi of athlete's foot, the composition including the reaction product of 8-hydroxyquinoline and finely divided boric acid, the 8-hydroxyquinoline constituting about one-eighth to 2 parts for 100 parts of the composition and the boric acid being present in amount in excess of the stoichiometric proportion for reaction with the 8-hydroxyquinoline.

2. A fungistatic composition for preventing growth of the fungi of athlete's foot, the composition including the reaction product of 8-hydroxyquinoline one-eighth to 2 parts and boric acid 15 to 35 parts, and an absorbent powder in amount to make the total 100 parts.

FOSTER DEE SNELL.
SAMUEL S. EPSTEIN.

REFERENCES CITED

The following references are of record in the file of this patent:

UNITED STATES PATENTS

| Number | Name | Date |
|---|---|---|
| 575,978 | Ostermann | Jan. 26, 1897 |
| 2,021,137 | Stone | Nov. 19, 1935 |
| 2,064,898 | Fetter | Dec. 22, 1936 |
| 2,175,780 | Prehn | Oct. 10, 1939 |

FOREIGN PATENTS

| Number | Country | Date |
|---|---|---|
| 572,126 | Germany | Mar. 14, 1933 |

OTHER REFERENCES

The Extra Pharmacopoeia by Martindale and Westcott, 20th ed., vol. 1, 1932, page 315.

U. S. Dispensatory, 22nd ed., 1937, page 1505.

Hager's Handbuch der Pharm., Praxis, 1925, vol. 1, pages 975 to 980.

Leaflet, "Ointment Quinolor Compound Squibb," 4 pages, Oct. 3, 1933.

Penn. Medical J., June 1940, article by Greenbaum et al. on Antisepticized Hose, pages 1289 to 1295.

Use of the Derman Parasiticides, by Wise et al., J. A. M. A., Oct. 3, 1936, pages 1126 to 1131.

Lundell et al., U. S. National Bureau of Standards Journal of Research, vol. 3, pages 91–96 (1929).

Gutman, Modern Drug Encyclopedia and Therapeutic Guide, 1934, page 898.

Science News Letter, July 21, 1945, page 44.